United States Patent [19]
Esteves et al.

[11] Patent Number: 6,130,384
[45] Date of Patent: Oct. 10, 2000

[54] COVERPLATE STORAGE DEVICE

[76] Inventors: Antonio Esteves, 1268 Bloor Street West, Apt. C, Toronto, Ontario, Canada, M6H 1N8; Peter Kanellis, 8 Baden Street, Toronto, Ontario, Canada, M5J 1Z4; Asterios Tsikrikis, 39 Ward Street, Toronto, Ontario, Canada, M6H 4A5; John Tsikrikis, 650 Lansdowne Avenue, Toronto, Ontario, Canada, M5H 3Y7

[21] Appl. No.: 09/089,036

[22] Filed: Jun. 2, 1998

[30] Foreign Application Priority Data

Jun. 3, 1997 [CA] Canada ................................. 2206814

[51] Int. Cl.⁷ ...................................................... H02G 3/14
[52] U.S. Cl. ............................ 174/66; 174/67; 220/241; 220/242; 312/328; D8/353; D13/177
[58] Field of Search ........................ 174/66, 67; 220/341, 220/242; 312/328, 329; D8/353; D13/177

[56] References Cited

U.S. PATENT DOCUMENTS

| | | | |
|---|---|---|---|
| 2,159,322 | 5/1939 | Drummond | ............................... 40/657 |
| 2,438,143 | 3/1948 | Brown | ................................. 191/12 R |
| 2,551,533 | 5/1951 | Gernheuser . | |
| 3,331,915 | 7/1967 | Lucci . | |
| 3,953,933 | 5/1976 | Goldstein | ............................. 40/642.02 |
| 4,102,466 | 7/1978 | Jadatz . | |
| 4,239,167 | 12/1980 | Lane | ..................................... 248/205.3 |
| 4,335,863 | 5/1982 | Rapps . | |
| 4,339,045 | 7/1982 | Bodin | ..................................... 211/85.9 |
| 4,425,725 | 1/1984 | Moustakas et al. . | |
| 4,431,113 | 2/1984 | Sims, Jr. . | |
| 4,702,709 | 10/1987 | Santilli . | |
| 5,009,610 | 4/1991 | Woskow . | |
| 5,594,206 | 1/1997 | Klas et al. . | |
| 5,902,960 | 5/1999 | Smith | ........................................ 174/66 |

*Primary Examiner*—Kristine Kincaid
*Assistant Examiner*—Dhiru R. Patel
*Attorney, Agent, or Firm*—Ralph E. Jocke; Daniel D. Wasil; Walker & Jocke

[57] ABSTRACT

A coverplate storage device includes a threaded first portion and a second portion. The threaded first portion is screwed into the standard screw receptacle of a coverplate (either a switchplate cover or plug receptacle plate cover) and the second portion receives small items, such as key chains. The invention also includes a wall guard to protect the wall under the hanging items from damage. Other variations of coverplate storage devices are provided which are secured to the coverplate by the screw receptacle or held in place using the light switch or plug receptacle.

23 Claims, 6 Drawing Sheets

COVERPLATE STORAGE DEVICE

FIELD OF THE INVENTION

This invention relates in general to a storage device and more particularly to a coverplate storage device.

BACKGROUND OF THE INVENTION

Hooks for hanging key chains, elastic bands, dish towels and other small items are commonly used in homes and businesses. These hooks are generally attached by screwing, nailing or gluing onto a surface, such as, a cupboard or wall. The storage device of this invention is attached without damaging any surface and is located at a coverplate, such as a switchplate cover for a light switch or a plug receptacle plate cover.

Other hooks have been devised for specific uses or for ease of installation. For example, U.S. Pat. No. 4,097,015 (Frishman) relates to a rotatable ceiling hook, which is particularly useful for hanging plants. U.S. Pat. No. 4,856,953 (Lin) relates to a replaceable hook system in which the hook is attached to a surface by a hook-driven screw. U.S. Pat. Nos. 4,964,602 and 5,207,404 (Reinhard) relate to a hook or eye device having a threaded end and in which the hook or eye end includes a configuration, such as, a phillips configuration, to enable it to be screwed into a surface with a corresponding type of driver. All of these hooks are attached to a wall or ceiling by screwing means.

The prior art hooks require a hole to be made in, or adhesive to be applied to, a wall, ceiling, or cupboard, and if removed will leave behind this hole or other damage to the surface. Thus a storage device which is easily and not permanently attached and on removal does not leave a hole in, or damage to, the wall, ceiling or cupboard is desirable.

SUMMARY OF THE INVENTION

This invention provides an improved storage device which is easily installed and removed and conveniently located. In the first embodiment, the storage device is installed by removing a screw which secures a coverplate and replacing that screw with the storage device by screwing the storage device into the screw receptacle to secure the coverplate.

In accordance with one aspect of the present invention there is provided a coverplate storage device comprising a first portion and a second receiving portion, wherein said first portion is insertable into a standard screw receptacle behind a coverplate screw slot such that said second portion remains outside of the screw receptacle and flush with the coverplate.

In accordance with a further aspect of the present invention, the first portion of the storage device is threaded such that insertion into the standard screw receptacle is accomplished by screwing in the storage device.

In accordance with an aspect of the present invention, there is provided a storage device comprising a screw with a washer dividing the screw into a first and second portion, wherein, the second portion of the storage device, from the washer to the head of the screw, is coated with a PVC or similar suitable covering.

In accordance with a further aspect of the present invention, the coverplate storage device is combined with a wall guard. The wall guard comprises a rectangular-shaped thin sheet of material (such as PVC) with a slot in the upper midpoint of the wall guard, such that, when the storage device is installed, the first portion of the storage device passes through the slot of the wall guard such that the upper end of the wall guard rests either on top of or under the lower end of the coverplate.

In accordance with an aspect of the present invention, there is provided an alternative coverplate storage device, comprising a thin sheet of rigid material (such as PVC) having a slot in an upper end and a hook or hooks at an outer edge, which is installed underneath a coverplate such that the hook or hooks extend beyond the perimeter of the coverplate. The alternative coverplate storage device is installed by removing a coverplate and placing the second coverplate storage device under the coverplate, and securing the coverplate with screws, one of which screws passes through the slot of the storage device. Alternatively, the slot in the coverplate storage device may fit around the switch or plug receptacle and remain in position by this means, or a combination of the two securing means. The alternative coverplate may also be installed above the coverplate, and for this installation the screw of the coverplate acts as the securing means.

In accordance with an aspect of the present invention, there are provided modifications of the alternative coverplate storage device, wherein the hook or hooks is replaced with a pivotable rod or with a spring clip (with or without hooks on the clip) or with a tray.

BRIEF DESCRIPTION OF THE DRAWINGS

A detailed description of the preferred embodiments are provided herein below with reference to the following drawings, in which.

Figure 1:
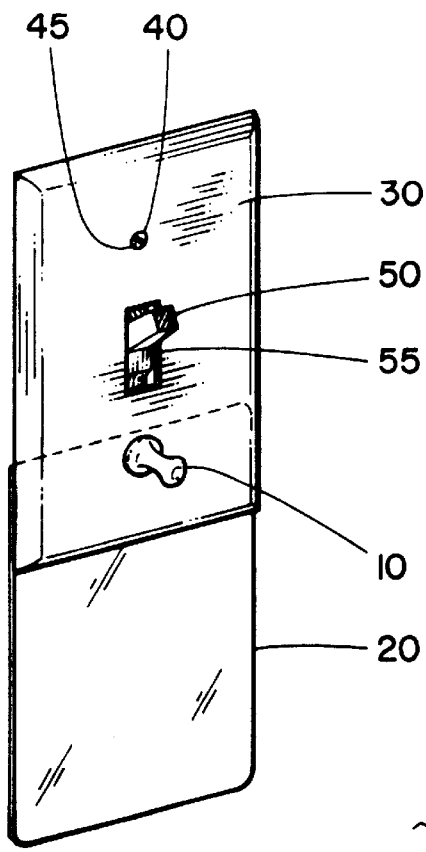
FIG. 1, in a perspective view, illustrates a coverplate storage device and wall guard in accordance with the preferred embodiment of the present invention.

In the drawings, preferred embodiments of the invention are illustrated by way of example. It is to be expressly understood that the description and drawings are only for the purpose of illustration and as an aid to understanding, and are not intended as a definition of the limits of the invention.

DETAILED DESCRIPTION OF THE PREFERRED EMBODIMENT

Referring to FIG. 1, there is illustrated in a perspective view, a coverplate storage device 10 and wall guard 20 in accordance with the first embodiment of the present invention. FIG. 1 shows a coverplate 30, coverplate screw slot 40 and screw 45. A switch 50 emerges through a coverplate switch slot 55.

Figure 2:
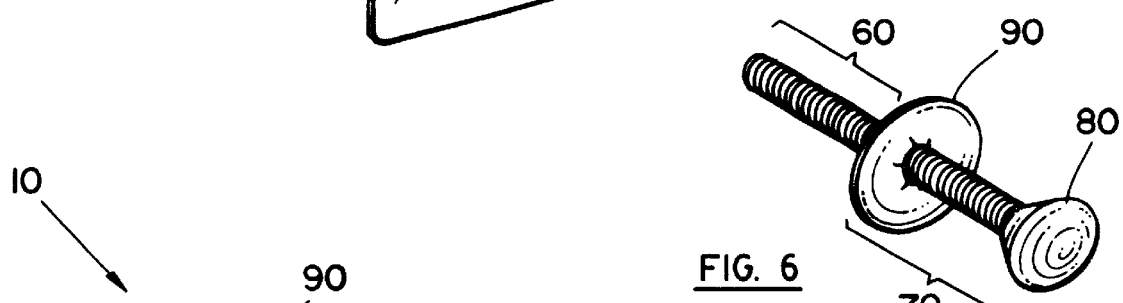
FIG. 2, in a perspective view, illustrates the device of FIG. 1.

In FIG. 2, the coverplate storage device of FIG. 1 is illustrated in a perspective view. FIG. 2 shows a first portion 60 and a second portion 70 of the coverplate storage device 10. The second portion 70 includes a head 80 and a base 90 and is covered with a coating 100.

Figure 4:
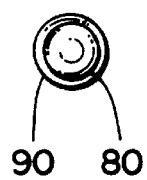
FIG. 4, in a top view, illustrates the device of FIG. 1.
Figure 3:
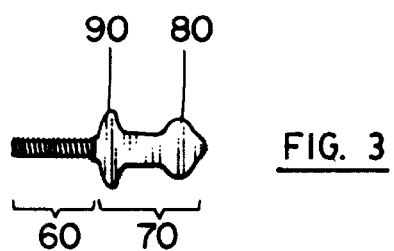
FIG. 3, in a side view, illustrates the device of FIG. 1.
Figure 5:
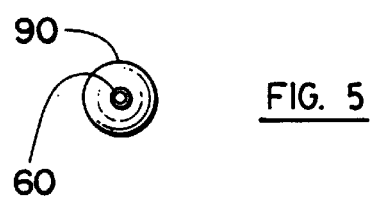
FIG. 5, in a bottom view, illustrates the device of FIG. 1.

In FIG. 3, the coverplate storage device of FIG. 1 is illustrated in a side view showing the first portion 60 and second portion 70. In FIG. 4, the coverplate storage device of FIG. 1 is illustrated in a top view showing the head 80 and base 90. In FIG. 5, the coverplate storage device of FIG. 1 is illustrated in a bottom view showing the first portion 60 and base 90.

Figure 6:
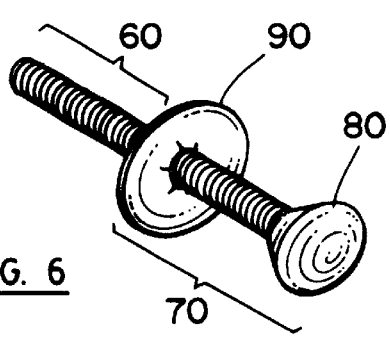
FIG. 6, in a perspective view, illustrates the coverplate storage device of FIG. 1 without a covering.

In FIG. 6, the coverplate storage device of FIG. 1 is illustrated in perspective view showing the components without the coating 100. The base 90 and head 80 are visible.

The coverplate storage device 10 can be easily installed in a convenient location in a room. How this is achieved is explained below with reference to FIGS. 1 and 2. A lower screw 45 is removed from a coverplate 30. The coverplate storage device 10 is inserted through the coverplate screw slot 40 of a coverplate 30 and into a screw receptacle (not shown) which is below the coverplate screw slot 40. The coverplate storage device 10 is installed by inserting the threaded first portion 60 into the screw receptacle and turning until the base 90 is flush with the coverplate 30.

The coverplate storage device 10 can be used on its own, without a wall guard. However, the wall guard provides protection for the wall against items which may hang on the coverplate storage device. The wall guard 20 has a slot (not shown) by which it is secured to the coverplate 30. In operation, the wall guard 20 is placed under (or over if preferred) the coverplate 30 and the slot of the wall guard 20 is lined up with the coverplate screw slot 40. The threaded first portion 60 of the coverplate storage device is inserted into the coverplate screw slot 40 and thereby through the slot of the wall guard 20 and is turned until the base 90 is flush with the coverplate (or the wall guard 20 if the wall guard is over the coverplate).

In operation, the coverplate storage device holds small items on the second portion 70. Such items may be key chains, elastic bands, watches, dish towels or other small items.

The coverplate storage device may be made in any way and with any materials which produce an end product which works to act as a device for storage of small items on a coverplate. However, in one particular mode of manufacture using available materials, the coverplate storage device 10 of the first embodiment of the invention comprises a 1¼ inch long, 6/32 inch diameter machine screw. The head 80 may be a flat head screw or any type of head (even one which has no configuration for receiving a driver). The base 90 of the second portion 70 is a washer, placed so that the base will be flush to the coverplate 30 when installed. The coating 100 is preferably a PVC (polyvinyl chloride) material, although any other materials which provide a suitable coating, such as types of plastics, are acceptable. For non-standard or commercial switchplates and outlets, the threaded first portion and slot size and location of the washer may need to be adjusted to fit properly. The wall guard may be made in any material and shape which serves to protect the wall from damage by the small items hanging on the receiving second portion of the coverplate storage device. The preferred material is PVC, but alternative materials may be used, such as, plastics, fabric, porcelain or wood.

Other variations and modifications of the preferred embodiment of the invention are possible. For instance, the second portion 70 may be modified to include multiple receiving ends and/or receiving ends of various shapes, such as, one that hangs downwards and curls up at the end. A plastic cylinder could be inserted into the screw receptacle so that the threaded first portion 60 could be merely inserted rather than screwed in (and the threading of first portion 60 would then not be required).

In an alternative coverplate storage device, a modification of the wall guard 20 becomes the coverplate storage device. There are various ways in which to include storage hooks on a wall guard type device. Storage hooks may be formed by cutting wedges in the thin PVC sheet of the wall guard, such that, the wedge points protrude out, or folding the sheet of the wall guard into hooks, or by shaping it into hollow ball type protrusions. This alternative coverplate storage device may be attached through the upper or lower coverplate screw slot 40. This coverplate storage device may include one or more hooks which hooks are outside of the perimeter of the coverplate. This coverplate storage device may rest under or over the coverplate and may be secured by a screw passing through a slot in the coverplate storage device and into the screw receptacle. This coverplate storage device may alternatively have a slot which fits around a light switch or plug receptacle, which holds the coverplate storage device in place.

Figure 7:
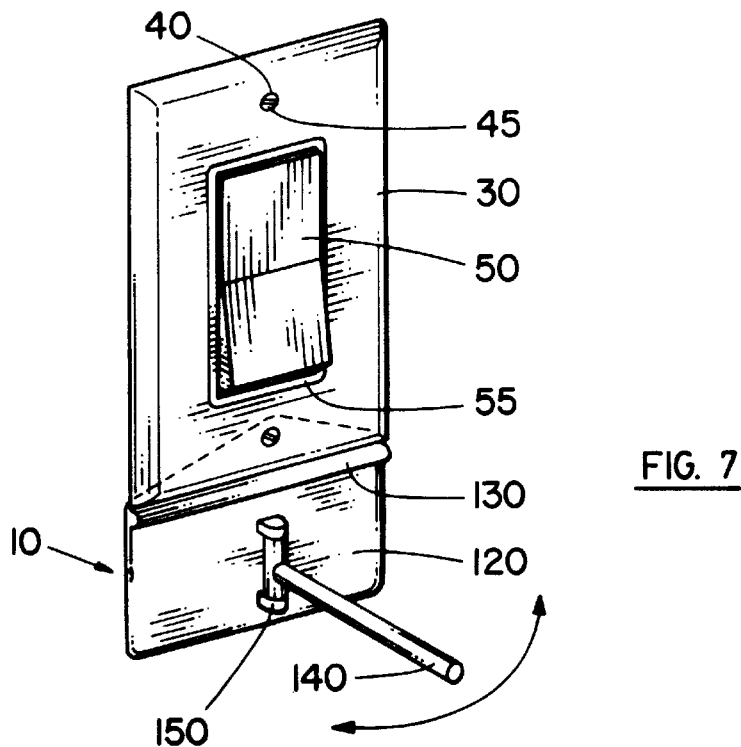
FIG. 7, in a perspective view, illustrates a second coverplate storage device in accordance with a further embodiment of the present invention.

Referring to FIG. 7, there is illustrated in perspective view, a second coverplate storage device 10. There is a coverplate 30, coverplate screw slot 40, screw 45, switch 50 and coverplate switch slot 55. The coverplate storage device 10 includes a backing 120, ridge 130, rod 140 and hinge 150.

In operation, the coverplate storage device 10 of FIG. 7, is installed by removing the lower screw 45 and loosening the upper screw 45 of the coverplate 30, pivoting the coverplate 30, sliding the backing 120 under the coverplate 30 and aligning a slot (not shown) in the backing 120 with the coverplate screw slot 40 and screw receptacle (not shown). The lower screw 45 is then reinserted and passed through the coverplate screw slot 40 and the slot of the coverplate storage device and screwed into the screw receptacle. The upper screw 45 is retightened. Although not required, the ridge 130 serves to keep the coverplate storage device from shifting due to items placed on the rod 140. The rod 140 may be stored at rest against the wall and when in use pivoted outwardly from the wall by the hinge 150. Any small items may be stored on the rod, such as dish towels and key chains. Alternatives to the rod are contemplated in this embodiment, such as replacing the rod 140 with a spice rack or replacing the rod with multiple rods.

Figure 8:
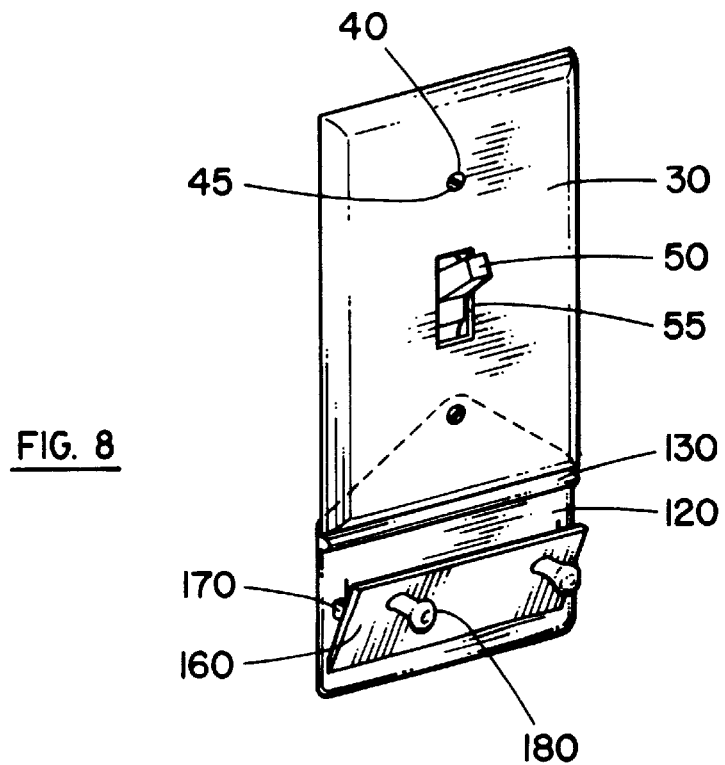
FIG. 8, in a perspective view, illustrates a third coverplate storage device in accordance with a further embodiment of the present invention.

Referring to FIG. 8, there is illustrated in perspective view, a third coverplate storage device 10. There is a coverplate 30, coverplate screw slot 40, screw 45, switch 50 and coverplate switch slot 55. The coverplate storage device 10 includes backing 120, ridge 130, clip 160, hinge 170 and hooks 180.

In operation, the coverplate storage device 10 of FIG. 8, is installed by removing the lower screw 45 and loosening the upper screw 45 of the coverplate 30, pivoting the coverplate 30, sliding the backing 120 under the coverplate 30 and aligning a slot (not shown) in the backing 120 with the coverplate screw slot 40 and screw receptacle (not shown). The lower screw 45 is then reinserted and passed through the coverplate screw slot 40 and the slot of the coverplate storage device and screwed into the screw receptacle. The upper screw 45 is retightened. The backing 120 of the coverplate storage device 10 includes a ridge 130 to maintain the position of the coverplate storage device 10. The clip 160 is attached to the backing 120 and remains closed at rest and when depressed opens by pivoting on the hinge 170. The clip may include hooks 180 to allow additional storage of small items. The clip may be used to store items, such as a pad of paper for notes, or individual notes may be left under the clip as reminders.

Figure 9:
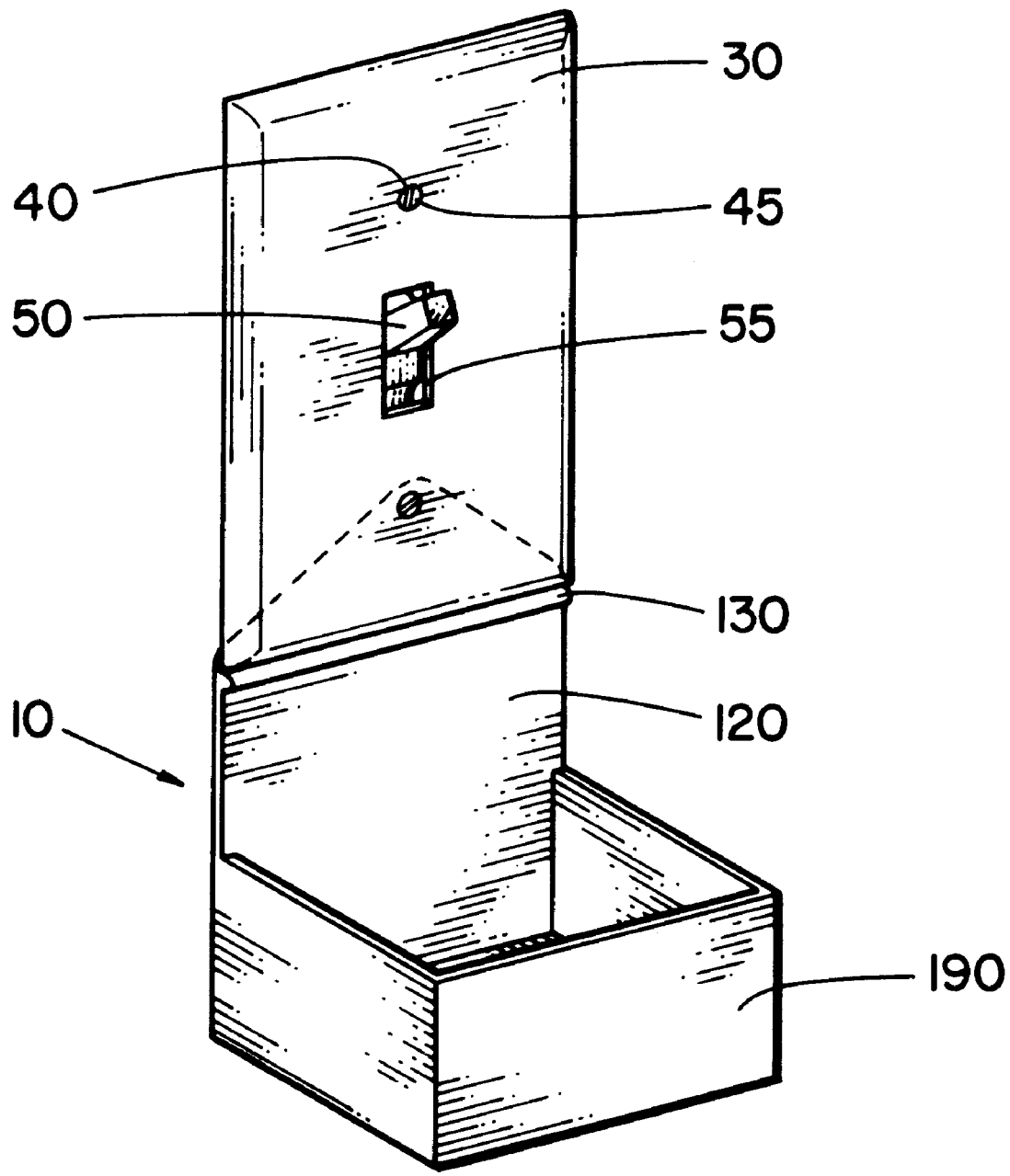
FIG. 9, in a perspective view, illustrates a fourth coverplate storage device in accordance with a further embodiment of the present invention.

Referring to FIG. 9, there is illustrated in perspective view, a fourth coverplate storage device 10. There is a coverplate 30, coverplate screw slot 40, screw 45, switch 50 and coverplate switch slot 55. The coverplate storage device 10 includes backing 120, ridge 130, and tray 190.

In operation, the coverplate storage device is installed in the same way as the coverplate storage device of FIGS. 7 and 8, and the ridge 130 serves the same purpose. The backing 120 of the coverplate storage device 10 is extended to form a tray 190. Small items, such as keys, money, notes and paper clips, may be stored in the tray 190.

Figure 10:
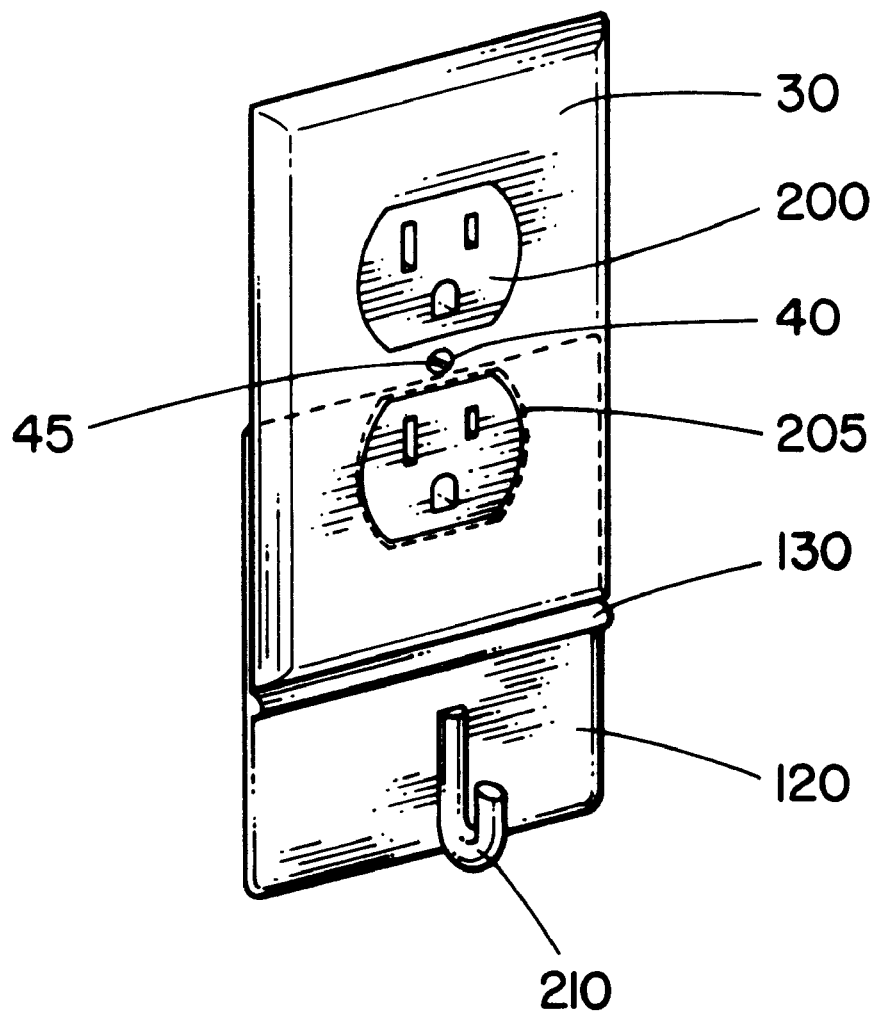
FIG. 10, in a perspective view, illustrates a fifth coverplate storage device in accordance with a further embodiment of the present invention.

Referring to FIG. 10, there is illustrated in perspective view, a fifth coverplate storage device 10. There is a coverplate 30, coverplate screw slot 40, screw 45, plug receptacle 200. The coverplate storage device 10 includes a backing 120, ridge 130, plug receptacle slot 205 and hook 210.

In operation, the coverplate storage device 10 is installed by loosening the screw 45 and coverplate 30, sliding the backing 120 under the coverplate 30 and aligning the plug receptacle slot 205 around the lower plug receptacle 200. The screw 45 is then reinserted and passed through the coverplate screw slot 40 and screwed into the screw receptacle underneath (not shown) and retightened. Variations of the fifth coverplate storage device include the use of the screw in the coverplate as an additional securing means for the coverplate storage device, as well as the use of both or only one of the upper and lower plug receptacles as a securing means for the coverplate storage device.

Figure 11:
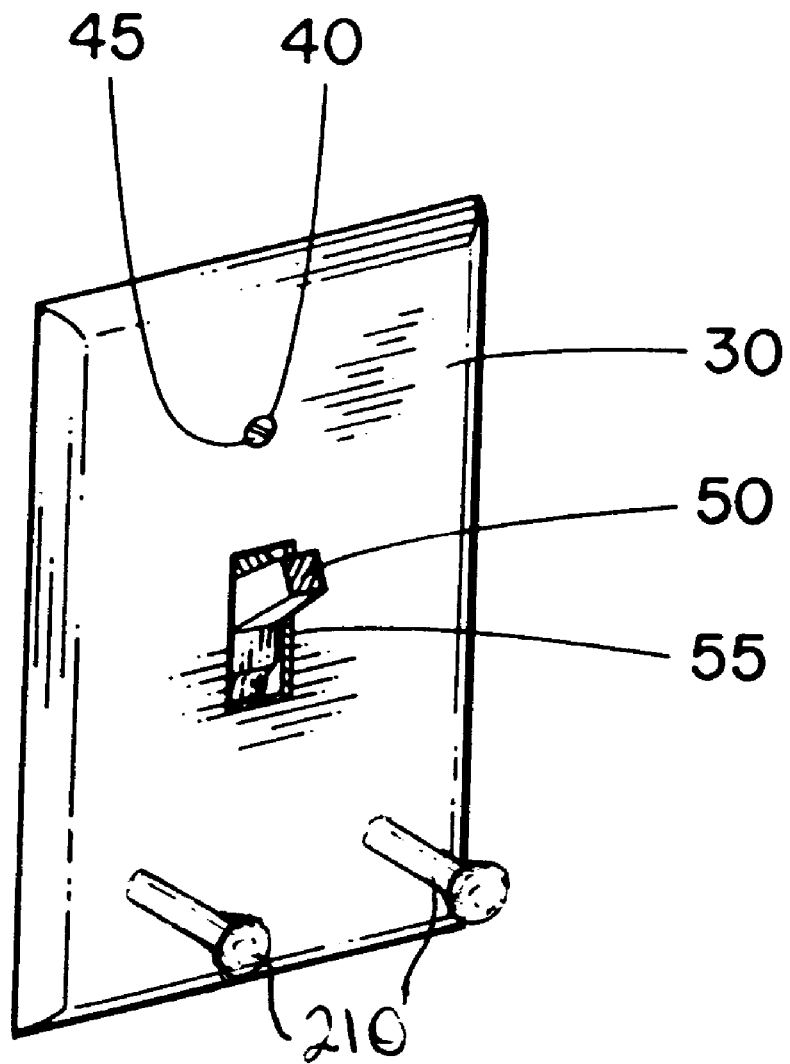
FIG. 11, in a perspective view, illustrates a sixth coverplate storage device in accordance with a further embodiment of the present invention.
Figure 12:
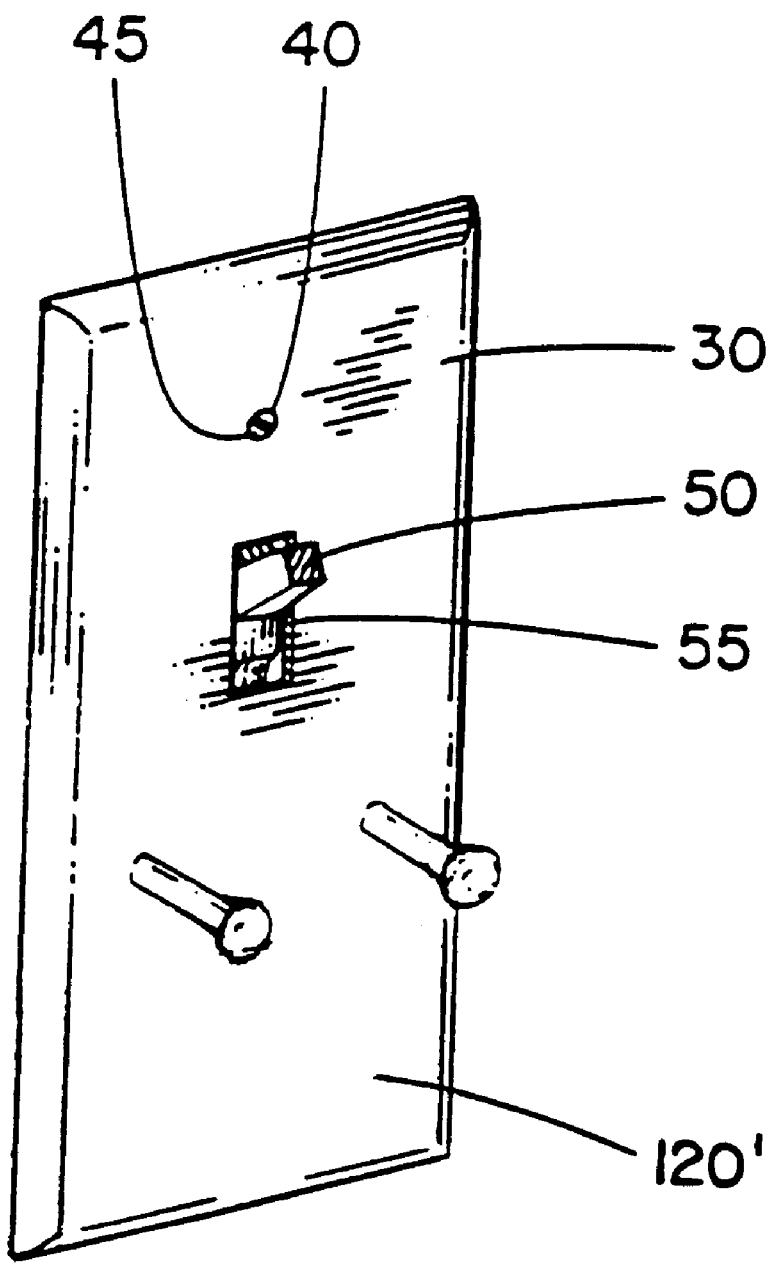
FIG. 12, in a perspective view, further illustrates a coverplate storage device in an embodiment of the present invention.

The coverplate storage devices and wall guard described above, contemplate the addition of storage features to existing standard coverplates at home or in commercial settings. However, the features described in these coverplate storage devices and wall guard, may all be incorporated directly into a coverplate. The modified coverplate would then be installed like any other standard coverplate by lining up to the screw receptacles and screwing in by screws. Such a modified coverplate may have hooks molded or attached directly to the coverplate and even an extended piece to act as a wall guard 1201. For example, FIG. 11 shows a coverplate 30 having a coverplate screw slot 40, screw 45, switch 50 and coverplate switch slot 55, and including a pair of pegs 210 integrally formed with the coverplate 30 and projecting forwardly therefrom.

It is understood that the invention as described herein could be manufactured by several methods and, in particular, it is noted that the storage devices of the present invention may be manufactured by injection molding.

Other variations and modifications of the invention are possible. All such modifications or variations are believed to be within the sphere and scope of the invention.

We claim:

1. A storage device for attachment to a cover plate, comprising
    a first portion for insertion into a screw receptacle disposed behind a screw slot in the cover plate, and
    a second portion disposed in front of and projecting forwardly of the cover plate for the storage of articles,
    wherein the second portion retains the cover plate affixed to a screw receptacle.

2. The storage device of claim 1 in which the first portion is threaded and engages the screw receptacle by threaded engagement.

3. The storage device of claim 2 in which the second portion is defined by a base affixed to an intermediate portion of the storage device and the second portion of the storage device projecting forwardly of the cover plate.

4. The storage device of claim 3 in which the base is a washer.

5. The storage device of claim 3 in which the second portion includes an enlarged head.

6. The storage device of claim 3 in which the second portion is covered with a coating.

7. The storage device of claim 2 in which the storage device includes a wall guard.

8. The storage device of claim 7 in which the wall guard is affixed to the storage device behind the cover plate.

9. The storage device of claim 7 in which the wall guard is formed from rigid plastic.

10. The storage device of claim 9 in which a storage structure projects forwardly from the wall guard.

11. The storage device of claim 10 in which the storage structure comprises a rod hinged to pivot in a horizontal direction and a ridge abutting a lower edge of the cover plate to retain the wall guard in a fixed position.

12. The storage device of claim 10 in which the storage structure comprises one or more hooks projecting forwardly of the wall guard and a ridge abutting a lower edge of the cover plate to retain the wall guard in a fixed position.

13. The storage device of claim 10 in which the storage structure comprises a tray projecting forwardly of the wall guard and a ridge abutting a lower edge of the cover plate to retain the wall guard in a fixed position.

14. A storage device for attachment to a cover plate covering an electrical switch or outlet, comprising
    a backing for attachment behind the cover plate,
    a storage structure disposed on a front face of and projecting forwardly of the backing for the storage of articles, and
    a ridge projecting from the backing and abutting a lower edge of the cover plate to retain the backing in a fixed position,
    wherein the backing is affixed to a component of the cover plate or the switch or the outlet.

15. The storage device of claim 14 in which the backing is suspended by a screw securing the cover plate to a screw receptacle in the switch or outlet.

16. The storage device of claim 15 in which the backing is formed from plastic.

17. The storage device of claim 15 in which the storage structure comprises a rod hinged to pivot in a horizontal direction and a ridge abutting a lower edge of the cover plate to retain the backing in a fixed position.

18. The storage device of claim 15 in which the storage structure comprises one or more hooks projecting forwardly of the backing and a ridge abutting a lower edge of the cover plate to retain the backing in a fixed position.

19. The storage device of claim 15 in which the storage structure comprises a tray projecting forwardly of the backing and a ridge abutting a lower edge of the cover plate to retain the backing in a fixed position.

20. The storage device of claim 14 in which the backing is suspended by a portion of the switch or the outlet which projects through an opening in the cover plate.

21. A cover plate assembly comprising:
a cover plate adapted to cover an electrical switch or outlet,
   wherein the cover plate has a front face,
a wall guard,
   wherein the wall guard is adapted to provide protection to a wall from articles,
   wherein the wall guard is located below the cover plate,
   wherein the wall guard extends from below the cover plate,
   wherein the wall guard has a front face,
      wherein the wall guard front face is free of outwardly extending projections,
      wherein the wall guard front face is generally parallel to the cover plate front face,
a storage structure for the storage of the articles,
   wherein the storage structure comprises a rod,
   wherein the storage structure projects outwardly from the cover plate front face.

22. The cover plate assembly according to claim 21 wherein the cover plate, wall guard, and storage structure are integrally molded together.

23. A storage device comprising
a wall guard,
   wherein the wall guard is adapted to provide protection to a wall surface from articles,
   wherein the wall guard is adapted to extend behind a cover plate of an electrical switch or outlet,
   wherein the wall guard is adapted to extend away from the cover plate in a direction along the wall surface,
   wherein the wall guard has a front face,
   wherein the wall guard is attachable to the cover plate, switch, or outlet,
a storage structure,
   wherein the storage structure is adapted for the storage of articles,
   wherein the storage structure is disposed on the front face,
   wherein the storage structure projects forwardly of the wall guard.

* * * * *